United States Patent [19]

Dietrich et al.

[11] 4,092,784
[45] June 6, 1978

[54] PROCESS AND APPARATUS FOR DRYING AND HEATING NYLON GRANULES

[75] Inventors: Ernst Dietrich, Worms; Ernst Guenther, Ludwigshafen; Werner Hoerauf, Ludwigshafen; Ernst Kissel, Ludwigshafen; Hermann Linge, Carlsberg; Eckart Neumann, Frankenthal; Eberhard Schaefer, Ludwigshafen, all of Germany

[73] Assignee: BASF Aktiengesellschaft, Ludwigshafen am Rhein, Germany

[21] Appl. No.: 698,855

[22] Filed: Jun. 23, 1976

[30] Foreign Application Priority Data

Jul. 8, 1975  Germany .............. 2530304

[51] Int. Cl.² ............................ F26B 3/14
[52] U.S. Cl. ........................... 34/13; 34/36; 34/65; 34/168
[58] Field of Search ........... 34/13, 28, 31, 33, 36, 34/167, 168, 171, 65; 264/17 A

[56] References Cited

U.S. PATENT DOCUMENTS

| 971,559 | 10/1910 | Provost | 34/167 |
| 2,148,946 | 2/1939 | Hubmann et al. | 34/167 |

FOREIGN PATENT DOCUMENTS 385,744  3/1965  Switzerland.

Primary Examiner—John J. Camby
Assistant Examiner—Larry I. Schwartz
Attorney, Agent, or Firm—Keil, Thompson & Shurtleff

[57] ABSTRACT

In a process for drying and heating nylon granules, in which the granules flow downwards through a vertical zone, hot inert gases which are free from molecular oxygen are passed in counter-current through the granules and the cooled granules are then intermittently discharged in part-streams, the improvement wherein the wet granules, or a suspension of the granules in water, are fed into the zone at the top, the granules are deposited as a layer, the water is led away, the layer of granules is then transferred into the next-lower part of the zone, the granules are there allowed to flow under gravity downwards through the zone, and inert gases which are free from molecular oxygen are passed in countercurrent upwards through the granules at from 70 to 200° C, with the proviso that the inert gas, before leaving the zone, is passed through the deposited layer of granules, in the lower part of the zone the granules are divided into part-streams over the entire cross-section of the zone, these part-streams are cooled and the granules are passed intermittently, but simultaneously over the entire cross-section of the zone, into a discharge zone, with the proviso that the discharge zone is only partially filled, as well as an apparatus for carrying out the improved process.

10 Claims, 4 Drawing Figures

PROCESS AND APPARATUS FOR DRYING AND HEATING NYLON GRANULES

Polycaprolactam granules obtained from the polymerization reaction contain monomers and oligomers, in accordance with an equilibrium state. These low molecular weight constituents must be removed by extraction, e.g. with water. A slurry of granules in water is thus obtained. However, on subsequent conditioning of the granules at elevated temperatures it is necessary to exclude molecular oxygen. Separate removal of water, and subsequent drying and heating in the various apparatuses always entails the hazard that the granules may come into contact with molecular oxygen at elevated temperatures and thereby suffer degradation.

In addition, it is difficult to pass granules completely through treatment zones and at the same time to maintain a uniform flow profile, i.e. a uniform flow velocity, over the entire cross-section. The effect of the wall on the flow velocity of the granules is such that the central part of the granules travels more rapidly. The consequence of this is that the residence times of the individual granule particles in the treatment zone differ, and a large proportion of the granules only leaves the treatment zone after a longer residence time than that of the granules from the middle zone. This is particularly undesirable if the granules are undergoing a reaction the extent of which will depend on the residence time. Particularly in the case of polycaprolactam granules, where heating results in an increase in molecular weight, a differing residence time detracts from the homogeneity of the granules which have been treated.

Swiss Pat. No. 385,744 discloses a shaft dryer, in which plastics granules are passed through a perforated base plate, divided in a honeycomb pattern, whilst at the same time being brought into contact with hot dry inert gases, and are then passed over a cooling coil and are discharged through a plurality of hoppers. The cooling coil used however provides no certainty that the plastics granules will be heated uniformly and discharged uniformly, and furthermore causes bridging, as a result of which a non-uniform flow velocity over the cross-section of the shaft results. In addition, the material is not discharged simultaneously over the entire cross-section of the tunnel. The publication points out, on page 1, lines 67 and 68, that the process is unsuitable for a heat treatment.

It is an object of the present invention to free plastics granules suspended in water, or wet plastics granules, from water, and to dry and heat the granules, in such a way that all the process steps are carried out in one overall process step, so as to avoid exposure to molecular oxygen, and at the same time in such a way as to maintain a narrow spectrum of residence times of the granules.

We have found that this object is achieved and that nylon granules may advantageously be dried and heated by a process in which the granules flow downwards through a vertical zone, hot inert gases which are free from molecular oxygen are passed in counter-current through the granules and the cooled granules are then intermittently discharged in part-streams, if the wet granules, or a suspension of the granules in water, are fed into the zone at the top, the granules are deposited as a layer, the water is led away, the layer of granules is then transferred into the next-lower part of the zone, the granules are there allowed to flow under gravity downwards through the zone, and inert gases which are free from molecular oxygen are passed in counter-current upwards through the granules at from 70° to 200° C, with the proviso that the inert gas, before leaving the zone, is passed through the deposited layer of granules, in the bottom quarter of the zone the granules are divided into part-streams over the entire cross-section of the zone, these part-streams are cooled and the granules are passed intermittently, but simultaneously over the entire cross-section of the zone, into a discharge zone, with the proviso that the discharge zone is only partially filled.

The invention further relates to an apparatus for drying and heating nylon granules, in which the granules flow downwards through the apparatus, uniformly over its entire cross-section, the said apparatus being in the form of a vertical cylinder with an inlet at the top and a conically tapering outlet at the bottom, and possessing (a) a rotatable screening ring concentrically and horizontally fitted in the top of the cylinder, and located below the inlet,
(b) a granule scraper located above the screening ring,
(c) a chute, located under the screening ring, with separate outlets for water and inert gases
(d) inlets for external supplies of inert gases, on the downward-extending section of the cylinder,
(e) a heat exchanger, provided in the bottom quarter of the cylinder, which ends above the conical taper of the cylinder and has orifices, distributed over the cross-section of the cylinder, for the passage of the granules, the upper surfaces of the heat exchanger, facing the stream of granules, being inclined to the passage orifices and forming an angle $\beta$ with the horizontal, which is from 45° to 83° C; and the outlet orifices of the heat exchanger being conically tapered,
(f) a horizontally movable grid located below the heat exchanger and
(g) a discharge zone located below the horizontally movable grid.

The new process and the new apparatus have the advantage that it is possible to free nylon granules from water, dry them and heat them in one process step, whilst reliably excluding molecular oxygen by a simple method. A further advantage is that as a result of uniform flow over the entire cross-section a narrow spectrum of residence times is achieved, and differences in the quality of the nylon granules are avoided.

Suitable granules of high molecular weight linear nylons which may be used are in general polylactams which have been obtained by polymerization of lactams of 4 to 12 carbon atoms, or nylons obtained from dicarboxylic acids and diamines, e.g. polyhexamethylene adipamide. Polycaprolactam has acquired particularly great industrial importance.

The process and the apparatus are of course also suitable for the treatment of other granular polycondensates, such as linear polymeric esters of high molecular weight, e.g. polyethylene terephthalate or polybutylene terephthalate.

The size of the granule particles is in general from 1 to 5 mm and especially from 1.5 to 3.5 mm.

In general, the starting material comprises the moist granules as obtained from the granulation process. In particular, however, polycaprolactam as obtained in the form of a suspension in water, after the process of extraction with water, may be used. The nylon granules are in general at a temperature of from 70° to 120° C, and as a rule from 3 to 12 parts by weight of water are present per part by weight of polycaprolactam.

The wet granules, or granules suspended in water, are fed to the top of a treatment zone. As a rule, the treatment zone has a diameter of from 1 to 4 meters and its length is usually substantially greater than, e.g. from 8 to 15 times greater than, its diameter. The wet granules, or suspension of granules in water, first form a layer deposit in the upper part of the zone, and the water is separated off and discharged. Advantageously, the granules are deposited on a screen, the water being separated off, and the granules obtained then being scraped off into the next-lower part of the zone.

It has proved particularly advantageous to deposit the granules on a rotating screening ring, to collect the water which has separated off in a chute below the said ring and discharge it, to force the inert gas which issues from the zone through the layer of granules, and then to scrape off the granules into the next-lower part of the zone. The fact that the inert gas used for heating is passed through the layer of granules before it leaves the apparatus has the consequence that even slight residual amounts of adhering water are stripped off due to the high flow velocity of the gas. Advantageously, the flow velocity of the inert gases is from 2 to 12 meters/second. This makes the subsequent drying process substantially easier.

In the next-lower part of the zone, the granules flow downwards under gravity. In the middle part of the zone, hot inert gases which are free from molecular oxygen are advantageously introduced from outside, at one or more, e.g. two or three, points, in the upper half of the said middle part. Nitrogen is industrially of particular importance for this purpose. The content of molecular oxygen in the gas should not exceed 2 ppm. The hot inert gases flow through the descending granules at a temperature of from 70° to 200° C. If granules other than polycaprolactam are being processed, a suitable temperature to choose is from 10° to 100° C below the softening point of the particular granules. Advantageously, from 2 to 8 kg of inert gases are employed per kg of granules. It has proved advantageous to recycle the inert gas, whilst removing the water entrained therein.

In the lower part of the zone, the granules are divided into uniform part-streams over the entire cross-section of the zone. The granules are cooled in the part-streams, advantageously by passing them through a shell-and-tube heat exchanger. Advantageously, the upper surfaces of the heat exchanger are joined to form a honeycomb-like structure, as will be explained later. The length of the heat exchanger is advantageously from 1/5 to 1/20 of the total length of the zone. Advantageously, each part-stream tube has a tapered outlet.

Next, the granules are passed intermittently, but simultaneously over the entire cross-section of the zone, i.e. simultaneously from each part-stream, into a discharge zone. An advantageous method of achieving this is to provide, under the rows of tubes of the heat exchanger, a grid which is movable crosswise, so that the granules are allowed to flow downwards through intermittent movement of the said grid. It is an essential characteristic of the invention that the discharge zone which follows next is at all times only partially filled with granules. This ensures that the granules move downwards uniformly over the entire cross-section of the zone and that therefore a narrow spectrum of residence times is maintained. The material is discharged by conventional methods, e.g. by means of bucket-wheel valves. Advantageously, inert gases, e.g. nitrogen, in an amount of from 0.5 to 2% of the amount of inert gas employed in the middle zone, are introduced, as an entraining gas, into the middle part of the discharge zone.

The relative viscosity of polycaprolactam granules can in this way be increased, e.g., from 2 to 5. The residence time is as a rule from 8 to 72 hours.

FIGS. 1 to 4 show an apparatus, and detailed portions thereof, for carrying out the above process.

FIG. 1 shows a cross-section of such an apparatus, comprising a cylinder 1, an inlet 2, a conical outlet 18 with orifice 3 for the granules, a heat exchanger 4 with passage orifices 5 for the granules and an inlet 10 and outlet 11 for the heat transfer medium, tapered outlet orifices 8 and a horizontally movable grid 9, as well as the rotatable screening ring 12, the chute 13 which is below the said ring and has a water outlet 14 and gas outlet 15, and a scraper 16 and feed lines 17 for inert gases.

A screening ring is located horizontally in the upper part of the cylinder, and concentrically therewith. The screening ring is fixed to an axle by means of spokes, so that it can rotate in its plane. Below the screening ring there is a ring-shaped chute which is open upwardly, i.e. towards the screening ring, so that it can receive the water which runs off, but is advantageously sealed at the sides, to prevent the passage of substantial amounts of gas, by means of a simple labyrinth. Over the greater part, e.g. from ⅔ to 4/5, of its circumference, which is advantageously separated from the lesser part, e.g. by a bulkhead, the chute is constructed as a gutter for the water which drips through the screening ring, whilst over the lesser part, e.g. from ⅓ to 1/5, of its circumference it is constructed as a deflector for the inert gas which is forced through the screening ring; accordingly, it has one outlet for water and one outlet for inert gases. A scraper, e.g. in the shape of a ploughshare, is located above the screening ring and scrapes the granules deposited on the screening ring, advantageously through the space between the spokes, into the next-lower part of the cylinder. The scraper is advantageously so arranged that, viewed in the direction of rotation of the screening ring, it comes after the gas outlet, so that the gases which issue are able to pass through the layer of deposited granules.

In the lower portion of the middle part of the cylinder there are external feed lines for inert gases. An advantageous embodiment comprises a toroid line which, at regular intervals, has passages extending through the cylinder wall, which passages, in turn, are advantageously in the form of perforated plates.

A shell-and-tube heat exchanger is located coaxially to the cylinder in the bottom quarter thereof, but terminates above the conical taper at the lower end of the cylinder.

The heat exchanger within the cylinder has passage orifices for the granules, distributed over the cross-section of the cylinder. The number of passage orifices depends on the size of the orifices and the diameter of the cylinder. Advantageously, the passage orifices for the granules have an internal diameter of from 2 to 25 cm, especially from 6 to 12 cm. The number of passage orifices is, e.g., from 5 to 600, especially from 35 to 100, per square meter of cross-section of the cylinder.

Figure 1:
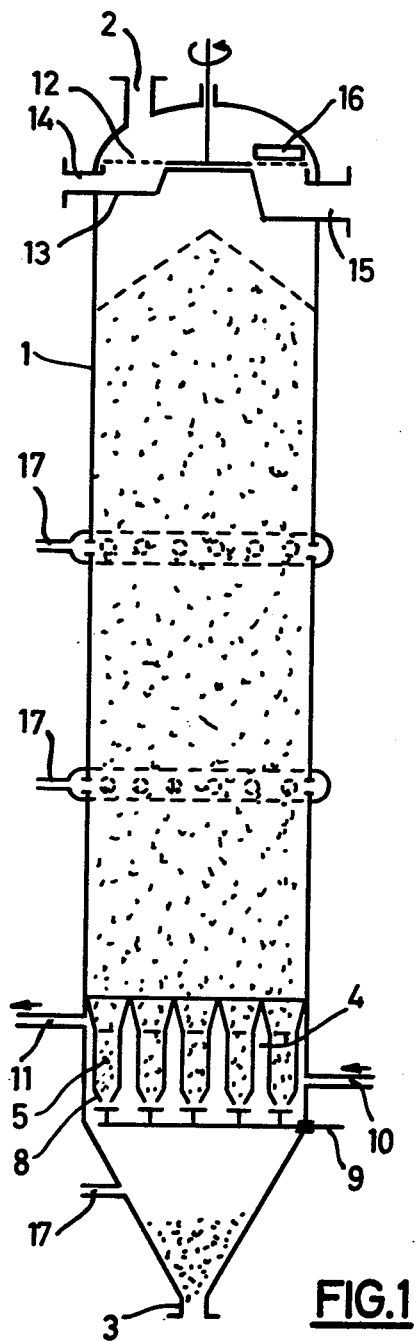
Figure 2:
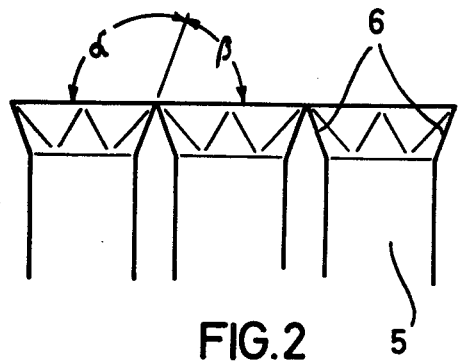
FIG. 2 shows a cross-section of a portion of the heat exchanger 4 with the surfaces 6 facing the flow of granules, and defines the angle $\beta$.
Figure 3:
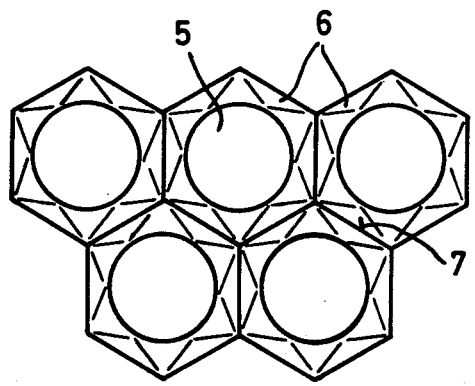
FIG. 3 shows an advantageous embodiment of the cross-section of the heat exchanger, viewed from above, showing the surfaces 6, which mutually form the edges 7.

The surfaces of the heat exchanger which face the stream of granules, i.e. which point upwards, are inclined to the passage orifices. The surfaces may together form edges and be joined in a roof-like structure. The inclination of the upper surfaces of the heat exchanger to the horizontal is defined by the angle $\beta$ (see FIG. 2). The angle $\beta$ is greater than the angle of repose of the granules which pass through the apparatus, and is less than 90°. The angle of repose of the particular plastics granules can easily be determined by simple preliminary tests. For example, the angle of repose of cylindrical polycaprolactam granules of diameter 2.5 mm and length 2.7 mm is 37°. Advantageously, the angle $\beta$ should not exceed 83°. Angles of from 45 to 83° have proved suitable.

In order that the stream of granules should not encounter any surfaces which could cause it to build up and which would thus interfere with uniform flow, and in order that the upper surfaces of the heat exchanger should show the required inclination, certain arrangements of the said surfaces are required, which then form edges. For example, an advantageous arrangement of the surfaces, and of the passage orifices for the granules, is that in which the edges formed by the inclined surfaces form a grid or honeycomb structure, e.g. with rectangular or, in particular, hexagonal orifices. The inclined surfaces of the passage orifices for the granules in the heat exchanger are advantageously followed by vertical tubes, to ensure smooth transport of the material.

The heat exchanger may be cooled by conventional methods, using a heat exchanger medium, e.g. water, which flows through the exchanger.

The tubes which protrude from the bottom of the heat exchanger have a downward conical taper. The acute angle which the cone forms with the horizontal corresponds to the abovementioned angle $\beta$, and also has the values, in degrees, mentioned above. The diameter of the reduced orifice should be at least 3 times the diameter of the plastic granules used, but advantageously from 8 to 12 times the diameter of the latter.

Figure 4:
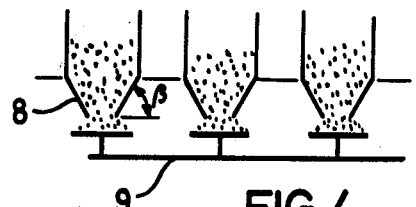
FIG. 4 shows the lower part of the heat exchanger, with the conically tapered outlet orifices 8 and the horizontally movable grid 9.

Below the tapered outlet orifices there is a shut-off device in the form of a horizontally movable grid. A particularly advantageous embodiment is shown in FIG. 4.

The individual bars of the grid are located below the bottom ends of the tapered tubes, advantageously at a distance therefrom which corresponds to from 2 to 8 times the diameter of the plastics granules and are so broad that a conical heap of granules can form on them without the granules flowing into the lower cone 18 of the cylinder 1, which has the outlet orifice 3. When the grid is moved horizontally, the entire cross-section of the outlet orifices of the individual heat exchanger tubes is released. Thus, the stream of granules can be regulated in a simple manner if the grid 9 is used as a control element which regulates the amount of granules flowing through or, more advantageously still, which regulates the upper level of the granules in the zone. Maintaining a distance between the individual grid bars and the outlet orifices also ensures that plastics granules cannot become jammed between the outlet orifices and the grid and thereby interfere mechanically with the control of the grid position.

The plastics granules leave the apparatus through the conically tapering cylinder outlet and pass, e.g., to a filling apparatus. A further device may also be attached to the outlet orifice 3, e.g. a vibrating chute or a pneumatic conveying device, for feeding any downstream apparatus.

What we claim is:

1. In a process for drying and heating nylon granules, in which the granules flow downwards through a vertical zone, hot inert gas, which is free from molecular oxygen, is passed in countercurrent through the granules and the granules are then cooled and intermittently discharged in part-streams, the improvement which comprises feeding the granules wetted with water, or a suspension of the granules in water, into the top of said vertical zone, initially depositing the granules as a layer in the upper part of said vertical zone where the water is separated off and discharged, then transferring the layer of granules substantially free of water into the next-lower part of said vertical zone wherein the granules are allowed to flow under gravity downwards through the zone while passing an inert gas which is free from molecular oxygen in countercurrent upwards through the granules at from 70° to 200° C, with the proviso that the inert gas, before leaving the zone, is passed through the initially deposited layer of granules, thereafter dividing the granules into part-streams in the lower part of the vertical zone over the entire cross-section of the zone, and cooling these part-streams as the granules are passed intermittently, but simultaneously, over the entire cross-section of the zone, into a common discharge zone, with the proviso that the common discharge zone is only partially filled at all times during the process.

2. A process as claimed in claim 1 wherein the nylon granules are composed of polylactams obtained by polymerization of lactams of 4 to 12 carbon atoms, or nylons obtained from the copolymerization of dicarboxylic acids and diamines.

3. A process as claimed in claim 1 wherein the nylon granules consist essentially of polycaprolactam.

4. A process as claimed in claim 1 wherein the nylon granules consist essentially of polyhexamethylene adipamide.

5. A process as claimed in claim 1 wherein the granule particles have a size of from 1 to 5 mm.

6. A process as claimed in claim 1 wherein the granule particles have a size of from 1.5 to 3.5 mm.

7. A process as claimed in claim 1 wherein the granules are initially deposited onto a screen in the upper part of said vertical zone, the water being separated off therefrom, and the granules thus obtained being scraped off into the next-lower part of said vertical zone.

8. a process as claimed in claim 1 wherein the part-streams of granules are cooled by indirect heat exchange with a cooling fluid surrounding the part-streams over the cross-section of the lower part of said vertical zone.

9. A process as claimed in claim 8 wherein there are about 5 to 600 part-streams of granules per square meter of cross-section in said lower part of said vertical zone.

10. A process as claimed in claim 9 wherein there are about 35 to 100 part-streams of granules per square meter of cross-section in said lower part of said vertical zone.

* * * * *

UNITED STATES PATENT AND TRADEMARK OFFICE
CERTIFICATE OF CORRECTION

PATENT NO. : 4,092,784
DATED : June 6, 1978
INVENTOR(S) : Ernst Dietrich et al

It is certified that error appears in the above-identified patent and that said Letters Patent are hereby corrected as shown below:

Col. 6, line 56, "a" should read -- A --.

line 64, "9" should read -- 8 -- .

Signed and Sealed this

Nineteenth Day of December 1978

[SEAL]

Attest:

RUTH C. MASON
Attesting Officer

DONALD W. BANNER
Commissioner of Patents and Trademarks